United States Patent [19]

Pritikin, deceased et al.

[11] Patent Number: 4,664,861

[45] Date of Patent: May 12, 1987

[54] METHOD FOR MAKING PRESERVED, HIGH MOISTURE, READY-TO-STUFF FOOD CASINGS

[75] Inventors: William B. Pritikin, deceased, late of Danville, by Claudia M. Pritikin, executrix; Burl L. Smith, Danville; Douglas J. Bridgeford, Champaign, all of Ill.

[73] Assignee: Teepak, Inc., Oak Brook, Ill.

[21] Appl. No.: 697,986

[22] Filed: Feb. 4, 1985

[51] Int. Cl.$^4$ ............................................. B29C 47/02
[52] U.S. Cl. .................................... 264/173; 106/168; 106/182; 264/174; 264/188; 264/218; 264/233; 264/343; 422/28; 426/105; 426/135; 426/326
[58] Field of Search ............... 264/184, 187, 340, 233, 264/344, 343, 174, 217, 195, 218, 173, 186, 188; 426/105, 140, 277, 278, 326, 392, 414, 135; 428/36; 106/168, 182; 422/28

[56] References Cited

U.S. PATENT DOCUMENTS

| 1,868,203 | 7/1932 | Henderson et al. | 246/140 |
| 2,802,744 | 8/1957 | Weingand | 99/176 |
| 2,917,397 | 12/1959 | Wilcox | 264/187 |
| 3,235,641 | 2/1966 | McKnight | 264/202 |
| 3,617,312 | 11/1971 | Rose | 99/176 |
| 3,864,499 | 2/1975 | Turbak | 426/138 |
| 3,872,196 | 3/1975 | Bridgeford | 264/202 |
| 3,981,046 | 9/1976 | Chiu | 17/49 |
| 4,221,821 | 9/1980 | Hammer et al. | 426/105 |
| 4,409,251 | 10/1983 | Higgins | 426/413 |

FOREIGN PATENT DOCUMENTS

| 2926590 | 1/1981 | Fed. Rep. of Germany . |
| 1584435 | 2/1981 | United Kingdom . |
| 1593996 | 7/1981 | United Kingdom . |
| 2071988 | 9/1981 | United Kingdom . |

*Primary Examiner*—Jeffery Thurlow
*Attorney, Agent, or Firm*—Howard M. Ellis; Michael L. Dunn

[57] ABSTRACT

Packaged fibrous and non-fibrous reinforced food casings containing sufficient water that presoaking prior to stuffing can be eliminated. The casings which rely on water as the sole or principal plasticizer do not rely on chemical type plasticizers like glycerin and propylene glycol. The premoisturized, ready-to-stuff casings are preserved with effective amounts of a high pH active antimycotic agent. Drying requirements can be reduced or eliminated.

35 Claims, No Drawings

METHOD FOR MAKING PRESERVED, HIGH MOISTURE, READY-TO-STUFF FOOD CASINGS

BACKGROUND OF THE INVENTION

The present invention relates generally to ready-to-stuff type food casings having sufficient moisture content that further moisture need not be added prior to stuffing. The invention especially relates to such casings which contain an antimycotic agent to prevent spoilage of the food casing prior to use.

Food casings, and more particularly, sausage casings like those made of regenerated cellulose and collagen have been widely used for years in processing frankfurters, sausages, bologna, salamis, etc. Tubular casings of regenerated cellulose, for example, are manufactured by extruding viscose into a fibrous web which is then regenerated in a coagulating bath. The regenerated gel casing is washed and plasticized usually in a glycerin containing bath. The plasticized gel film is inflated and passed through lengthy gas fueled hot-air dryers where the moisture content of the casing is reduced to a relatively low level, e.g. 5 to 10 percent. The dried casings may be shirred into tightly compressed strands and packaged. They may be stored for indefinite time periods or shipped to meat processing plants for stuffing at some later time. Before being used by meat processors the tubular strands or flat large size casings are customarily soaked in water to increase their moisture content usually to 30 to 55 percent on an "as is" basis (total casing weight). The extra moisture imparts additional plasticization and flexibility to withstand high speed stuffing without tearing and permits tutular shirred strands to extend smoothly without breaking.

The foregoing protocol, relating to plasticized and dried cellulosic casings, ordinarily does not present special problems with regard to preservation from molds, yeasts and bacteria developing during storage. This is true because such casings contain from 18–25 percent by weight glycerin and/or propylene glycol which in addition to being plasticizers incidentally impart microbicidal properties to the casing. In addition, by maintaining relatively low moisture levels during packaging and storage, conditions favoring germination of microbes are minimized.

However, with the advent of newer automated meat processing equipment, there has been greater emphasis on stuffing operations where pre-soaking procedures for casings at the meat packing plant are totally eliminated. Therefore, with greater frequency, casings are being supplied to food processors as ready-to-stuff shirred strands and flat reelstock, particularly where large size casings are used for salamis, bologna, meatloaves, cooked and smoked ham butts, etc. Because of the relatively high moisture levels of ready-to-stuff type casings, bacteria, yeasts and molds, can form on the casings during storage.

Where such casings are regenerated cellulose they have been manufactured as previously described, except after addition of a plasticizer such as glycerin, the casing is dried and then remoisturized.

It was not uncommon to find the practice of drying after addition of plasticizer, to allow other process steps. For instance, printing on casing sidewalls or for application of peeling aids or to reduce the moisture content to a level thought more conductive for shirring. As a final step however, much of the water previously removed by driers was then added back to the casings in order to place the casings in ready-to-stuff condition. Accordingly, previous ready-to-stuff type casings were mainly dependent on relatively high concentrations of costly chemical type plasticizers as primary plasticizers which incidentally also inhibited the development of microbes.

Such high concentrations of chemical type plasticizers however, may pose a potential indirect health hazard. Those casings containing such high levels of propylene glycol, glycerin and other similar type materials may in some instances diffuse from the casing sidewall into the surface of the encased meat product after stuffing. The level of antimycotic agent present although relatively high, would not prevent spoilage throughout the packaged meat product, but could mask visual evidence of meat spoilage and deterioration typically manifested by the appearance of sliming, souring or greening formation on the surface. Accordingly, such high levels of polyols added to food casings primarily as plasticizers may block the natural indicators of food spoilage which are necessary for consumer safety.

Premoisturized, ready-to-stuff type casings relying on high levels of chemical type preservatives and primary plasticizers are described in the following patents:

U.S. Pat. No. 1,868,203 discloses a process for preparing natural type sausage casings by treating in a 20 percent solution of glycerin and water. The casings can be immediately filled with meat or dried to remove moisture and stored for indefinite periods without deterioration. U.S. Pat. No. 2,802,744 discloses premoisturized, ready-to-stuff alginic acid or alginate sausage casings which may have water contents of 150 percent. 15 to 40 percent glycerin may be added onto the casing as a plasticizer. Such casings can be packaged in polyethylene bags and stored.

U.S. Pat. No. 3,617,312 discloses a polymeric water insoluble overcoating for dry sausage casings containing an antimycotic agent which slowly leaches from the overcoating after the casing is stuffed with meat emulsion. These casings were not premoisturized and packaged and required an additional water insoluble polymer such as a polyester or polyacrylic. Furthermore, the antimycotic agent was primarily in the overcoating rather than throughout the casing. The antimycotic agents incorporated into the water insoluble polymer could include, among many others, lower alkyl esters of p-hydroxybenzoic acid.

U.S. Pat. No. 3,864,499 discloses conventional dried casings treated with a high percentage of glycerin plasticizer. The glycerin containing casings, which are soaked prior to stuffing, are treated with additional oil soluble antimycotic agents, e.g. alkyl esters of p-hydroxybenzoic acid, dispersed in a viscose composition containing colloidal sized droplets of oil and organic cosolvents. The colloidal sized oil droplets prevent removal of the additional antimycotic agent during soaking prior to stuffing.

U.S. Pat. 3,981,046 relates to the humidification of cellulosic food casings carried out by the application to the interior of such casings of an aqueous solution containing at least 25 percent chemical type plasticizer. The plasticizers include various polyols, such as glycerin, propylene glycol, PEG and the like, the amount of glycerin present being suitable to plasticize the casing. The plasticizers also operate to retard imbibition of water by the casing.

U.K. Patent Specification No. 1,593,996 describes premoisturized large size tubular food casings containing from 25 to 71 percent moisture based on total weight of dry cellulose in the casing, wherein the casings also contain from 25 to 40 percent glycerin based on dry weight of cellulose present and an even higher percent glycerin when based on weight of liquid in the casing. In addition to glycerin, other antimycotic agents are suggested to prevent mold and fungi growth. U.K. Patent Specification No. 1,584,435 discloses in a preferred embodiment a premoisturized food casing having at least 27 percent by weight moisture content based on dry cellulose. The casings require 25 to 40 percent glycerin and at least 15 percent propylene glycol based on dry weight of cellulose for storagability to inhibit development of microorganisms. Other antimycotic agents are also mentioned for use along with the polyols, such as alkali metal and alkaline earth metal salts of propionic acid or sorbic acid and lower alkyl esters of p-hydroxybenzoic acid including the methyl, ethyl or propyl esters, preferably in amounts of at least 2.5 percent by weight of liquid components in the casing. The tubular cellulosic food casings described therein may be prepared by applying the essential amounts of water and antimycotic agent to suitable "dried" tubular food casings. U.K. Application No. 2,071,988 also relates to preparation of premoisturized casings having up to 40 percent water based on total casing weight. In order to control the development of molds, etc., the water activity of the casing is controlled by means of various chloride salts, e.g. sodium chloride, magnesium chloride, ammonium chloride, etc., preferably when used in combination with another antimycotic agent, as for example, propylene glycol. Glycerol may also be added to the casing. U.S. Pat. No. 4,409,251, like that of U.K. Application No. 2,071,988 controls the development of mold, yeast and bacteria prior to stuffing by maintaining the water activity of the casing at a sufficiently low level in conjunction with a glycerin content in the casing of at least about 40 weight percent based on the total weight of dry cellulose in the casing and again even a greater percent glycerin when based on liquid in the casing.

German Patent Publication No. P 29 26 590 5 discloses high moisture casings which are sterilized by heat and stored in sterile packages. Such heating is energy intensive and is therefore undesirable. In addition the heating of such casings to sterilization temperatures can adversely affect the properties of the casing. The preserved, premoisturized casings disclosed above require high temperature sterilization or else require relatively high levels of polyols as plasticizer, and therefore, requirements for water as the primary plasticizer are reduced. Besides relying on glycerin, propylene glycol and other costly polyols for microbicidal and plasticizing properties, ready-to-stuff casings in many of the above instances are dried in energy intensive dryers or else require high temperature sterilization. Accordingly, there is a need for an improved ambient temperature preserved, premoisturized ready-to-stuff type sausage casing which can be stored indefinitely without developing molds, yeasts or bacteria wherein water performs as the sole or principal plasticizer.

BRIEF DESCRIPTION OF THE INVENTION

The present invention provides for novel premoisturized ready-to-stuff food casings and methods for their manufacture. "Ready-to-stuff" as used herein means having sufficient moisture to permit stuffing prior to shipment to the meat packing plant. Such "ready-to-stuff" casings contain at least 40 percent and preferably at least 55 percent water by dry weight of casing and also contain less than 15 and preferably less than 10, and more specifically, from 0 to less than 10 percent polyol by weight of liquid in the casing. Humidification and plasticization are achieved by means of the water taken up by the casing during manufacture, thus, substantially eliminating or reducing the requirement for conventional chemical type plasticizers, e.g. glycerin, propylene glycol and other food grade polyols. The casings are preserved to inhibit development of molds, yeasts, and bacteria allowing storage for indefinite time periods. The humidified casings are preserved only with an effective amount of a high pH active antimycotic agent. The "effective amount" is an amount which will inhibit the development of a broad range of common molds without significantly affecting the surface degradation of products contained in the casing. The "effective amount" may go as low as a few parts per million and is usually less than 0.5 percent by weight of liquid in the casing. It is understood that inclusion of an effective amount of high pH active antimycotic excludes the presence of 15 percent or more polyol by weight of liquid in the casing. "High pH active" means that the antimycotic preservative is effective throughout the pH range of 5 to 9 at a concentration of less than 0.2 percent by weight of liquid in the casing. However, it is to be understood that "effective amount" is intended to include amounts of high pH active preservatives in excess of 0.2 percent by weight of liquid in the casing.

The premoisturized casings rely on water as the primary plasticizer, and in some instances the sole plasticizer, in combination with minor amounts of a high pH active antimycotic agent as a preservative. The combination provides important benefits in terms of conservation of energy. That is, energy requirements customarily expended in drying food casings can be substantially reduced or even eliminated. Further economic benefits are also realized as a result of reduced requirements for more costly chemical type plasticizers, e.g. glycerin and other polyols.

The invention includes preserved, high moisture unreinforced and fibrous reinforced gel type casings, such as flat stock for large type stuffed meat products, like bolognas, and for use in conjunction with automatic stuffers etc. In the case of gel type premoisturized casings, all drying requirements may optionally be eliminated. The invention also includes such casings in prepackaged form.

DETAILED DESCRIPTION OF THE INVENTION

The present invention generally relates to premoisturized food casings, their methods of manufacture and more particularly, to ready-to-stuff meat or sausage casings prepared with sufficient moisture as to be readily stuffed with a food product without further moisture being added beforehand by the food processor. The casings are preserved with a sufficient amount of a high pH active non-polyol antimycotic agent, preferably an alkyl ester of p-hydroxybenzoic acid, to prevent the development of molds, and desirably other microorganisms such as yeasts and bacteria, even during prolonged periods of storage.

The fibrous and non-fibrous reinforced ready-to-stuff casings of the present invention may be used for meat and sausage products like frankfurters, bologna, salami, deli-loaves, turkey rolls, hams, etc. Unlike conventional sausage casings supplied to meat processors in shirred strands and in relatively short flattened tubular lengths, which must first be soaked in water prior to stuffing, casings of the present invention contain sufficient moisture that soaking or other moisture addition processes need not be performed by food processors before stuffing. Thus, for purposes of the present invention, such expressions as "premoisturized" and "ready-to-stuff" are intended to mean food casings having sufficient water that food processors may omit the customary step of soaking the casings just prior to stuffing.

The moisture content of the casings is usually at least 40 percent by weight based on dry weight of casing. In most instances, the casings will be plasticized with from about 40 to about 240 percent by weight based on dry weight of casing. More preferably, the water content will range from about 55 to about 170 percent by weight based on dry casing.

Unlike other premoisturized ready-to-stuff casings, those of the present invention do not rely on polyols like glycerin and propylene glycol as plasticizers, nor as preservatives. The present invention contemplates embodiments whereby requirements for polyols for plasticizing and preserving casings can be dramatically reduced and even totally eliminated. Instead, the premoisturized casings are plasticized with higher levels of water, such as previously described and other high pH active antimycotic agents are used instead of polyols. If polyols are present, they will be present in minor amounts, i.e. less than 15 percent and preferably less than 10 percent by weight of liquid in the casing.

This is a rather significant departure from prior art premoisturized and preserved casings, such as described in U.S. Pat. No. 4,409,251, where ready-to-stuff type casings have at least 40 weight percent glycerin based on total weight of dry cellulose in the casing. British Patent Specification No. 1,584,435 actually describes the need for substantially greater amounts of polyol for the particular level of water used which imparts the desired flexibility and stuffing characteristics to the casing. Thus, it was surprising to find that high moisture levels can be maintained without accompanying higher levels of propylene glycol, glycerin and the like. Accordingly, the higher water levels of the subject casings not only provide economic benefits in terms of raw materials, but it was also found that the performance of the casing per se in terms of feed characteristics in stuffing equipment is also improved in many instances over other premoisturized, ready-to-stuff casings prepared with lower water contents and higher polyol loadings.

According to the method of the present invention the water imbibed by the casing during washing will plasticize the casing and the prior art need for adding polyol or drying the casings subsequently and then remoisturizing can be eliminated at significant cost savings.

In accordance with the present invention it has been surprisingly found that the casings can be preserved by adding on controlled amounts of high pH active antimycotic agents with little or no polyol. Examples of such antimycotic agents are 1,2 benzisothiazolin-3-one; 1,2 dibromo 2,4 dicyanobutane; natamycin and the alkyl esters of p-hydroxybenzoic acid. Antimycotic agents commonly used in the prior art which are free acids or acid salts are generally not effective throughout the pH range of 5 to 9 and are therefore generally not high pH active antimycotic agents in accordance with the present invention. Preferred high pH active antimycotic agents are the lower alkyl ($C_1$–$C_7$) esters of p-hydroxybenzoic acid.

The antimycotic agent may be applied to the wet casing from an aqueous medium. The applied antimycotic agent may be on the surface or enter the casing. In either case the agent is considered to be "incorporated into the casing". In the case of alkyl esters of p-hydroxybenzoic acid the solution is usually substantially saturated with the ester with or without the benefit of accompanying surfactants or cosolvents. The objective, in either case, is to incorporate amounts of antimycotic agent into the casing sufficient to inhibit the development of molds and desirably also bacteria and yeasts during storage of the casing without altering normal shelf-life of the meat product after the casing is stuffed.

In most instances, the antimycotic agent should be free or substantially free of acid groups or acid salts.

High pH active antimycotic agents are desirable because in accordance with the present invention, it has been found that storing casing at a low pH, e.g. below 5 is deleterious to the casing. Propionic and sorbic acids, for instance, at low pH over a period of time, i.e. . . . during storage and shipment, may have a deleterious effect on the casing material resulting in a weakening and loss of wet strength, etc. and in addition are usually not high pH active. Furthermore, it has been found in accordance with the present invention that even if the casing is stored at a low pH, the pH tends to rise with time, possibly due to the reactivity of the —OH groups in the cellulose and starches from which many such casings are made. When the pH rises to pH 5 to 9, many common antimycotics tried in the prior art become ineffective, especially those antimycotics which have a high molecular weight percent of acid groups. Effective antimycotic agent compounds for use in the present invention usually contain less than 10 molecular weight percent acid groups, i.e. they are essentially free of such groups.

The concentration of antimycotic agent may be 50 ppm or lower, by weight of liquid in the casing. However, for the parabens (alkyl p-hydroxybenzoates) the preferred range is from about 100 to about 1100 ppm, and more optimally, from about 200 to about 500 ppm. At such concentrations the casings can be stored and shipped over extended time periods without the development of microorganisms. Concentrations as high as 2000 ppm (0.2%) may be used. Even higher concentrations may be employed, but without added benefit, and there may be an added risk of diffusion into the meat product after stuffing which may mask the natural formation of slime or greening normally observed with deterioration and spoilage of meat products.

In the case of paraben esters, the effectiveness of the casings in resisting development of microorganisms may be influenced by the solubility of the particular ester in the treating bath from which it is applied. That is, the solubility of the alkyl esters of p-hydroxybenzoic acid in water is limited, e.g. 400 ppm at 25° C. for the propyl ester; 150 ppm for the butyl ester and 1100 ppm for the ethyl ester. The preferred esters are therefore lower alkyl esters, e.g. methyl, ethyl, propyl, butyl, or n-heptyl.

In some instances, it was found that aqueous treating solutions containing propyl paraben prepared at room temperature did not appear to provide adequate microbicidal activity for the casing. Hence, the present invention contemplates the use of saturated solutions heated above ambient temperature conditions, i.e. . . . above 25° C. For example, propyl paraben may be utilized in water where the solubility of the ester at 40° C. increases to about 640 ppm. After the moisturized casings are treated in aqueous solutions of propyl paraben at elevated temperatures and cooled, some of the antimycotic agent imbibed may crystalize insitu and provide for continuous saturation of the liquid phase of the casing and protect the casing against development of microbes. Accordingly, such casings may be plasticized only with water and preserved with partially dispersed and partially dissolved paraben ester. The requirement for using heated saturated aqueous solutions for other lower alkyl esters, e.g. methyl and ethyl, may be omitted due to their more favorable solubility characteristics.

As an alternative preferred embodiment, it is sometimes advantageous to first dissolve the antimycotic agent in a cosolvent. Dissolution of certain lower alkyl esters of p-hydroxybenzoic acid, e.g., propyl paraben in an alcoholic cosolvent can improve overall microbicidal activity. For example, only 0.04 grams of propyl paraben will dissolve in water (100 grams) at 25° C.; whereas, 26 grams will dissolve in 100 grams of propylene glycol. Therefore, the paraben treating bath may be prepared by first dissolving the ester in an alcohol, such as propylene glycol. Other suitable food grade polyols may be used as alcoholic cosolvents. However, propyl paraben, for example, appears to have the most favorable solubility characteristics in propylene glycol. Ethanol may also be used. The parabens, which quickly dissolve in the co-solvent are then added to water normally without precipitation of the ester. The alcoholic cosolvents are generally employed in "ester solubilizing amounts," which for purposes of the immediate invention include quantities which aid in the dissolution of the alkyl esters of p-hydroxybenzoic acid and exclude quantities which impart material antimycotic activity to the casing. Thus, baths for applying the antimycotic agent may contain, for example, from about 100 to 1500 ppm propyl paraben and from 0 to about 32 percent by weight of cosolvent such as propylene glycol and more preferably from about 2 to about 25 percent by weight cosolvent. More preferably, aqueous application baths will contain from about 300 to about 1100 ppm propyl paraben and from 0 to about 20 weight percent propylene glycol cosolvent. The actual amount of cosolvent, if used, will usually be the least amount needed to presolubilize the paraben ester before incorporating into the aqueous application bath, which bath may be maintained at ambient or elevated temperatures. As previously indicated, the premoisturized fibrous casings may be free or substantially free of polyols, e.g. . . . propylene glycol, ethanol and the like; however, when employed, the amount of cosolvent added on to the casings will be below 15 percent by weight, and more specifically below about 10 percent by weight. "Substantially free" of polyols means that the amount of polyol present does not materially change the antimycotic properties of the casing.

The casings contemplated herein are tubular food casings in the form of flat reelstock or individual shirred strands, and more particularly, fibrous reinforced and non-fibrous reinforced meat casings. Typically, casings are formed from cellulose, cellulose ethers, esters, collagen, polyvinyl alcohol, amylose, high amylose starches, to name but a few. For example, casings prepared from regenerated cellulose, cellulose ethers, etc., can be made by processes such as the cuprammonium process, by denitration of cellulose nitrate, and preferably by the "viscose process". According to one embodiment of the present invention a fibrous web consisting of cellulosic fibers, hemp, rayon, sisal or other fibrous materials may be coated with viscose by extrusion methods using known techniques. The coated web is then coagulated to effect regeneration of the cellulose by passing the extruded material into an aqueous bath containing, for example, sodium sulfate and sulfuric acid. The coagulation liquid is applied to convert the cellulose xanthate to cellulose. The regenerated casing is then washed in water to purify and remove chemicals to form a gel type casing having a high moisture content. The casing is then treated in the bath containing the antimycotic agent, as previously described, to preserve the casing. The casings prepared according to the foregoing method can be stored over prolonged time periods and supplied as flat reelstock to meat processors.

The high moisture gel type casings in the form of flat reelstock provide very smooth performance, for instance, in modern integrated shirr-stuff and clip type meat processing equipment without the need for further soaking prior to stuffing. Such machines perform the steps of first gathering or loosely shirring the ready-to-stuff casing on a stuffing horn which is subsequently indexed to a stuffing position. The casing is then filled with a meat emulsion and closed by means of an automatic clipping or twisting mechanism. Equipment of this type is available under the designation Poly-Clip, a registered trademark of Niedecker GMBH of Frankfurt, West Germany. The casings of the present invention may operate smoothly in the equipment described in U.S. Pat. No. 4,358,873. Pre-shirred strands of ready-to-stuff casings are also intended within the context of the present invention. Under such circumstances, some drying may be desirable for most efficient shirring operation. However, it is to be understood that even under those circumstances where the casings are subjected to a drying step the final elevated moisture content will be within the range described hereinabove.

Where a higher density shirring is desired, obviously further drying of the casing will be required in which case some glycerin can be added by conventional means to aid in plasticizing the casing and to avoid possible damage as a result of pinholing. Drying and the addition of glycerin may also be desirable in those instances where, for example, high temperature meat release or peeling aids are coated onto interior walls of casings to avoid removing meat with the casing when stripped by consumers. Drying may also be required in those instances where direct printing onto the finished casing is desired. It should be noted, however, that alternative type low temperature peeling aids, such as carboxy methyl cellulose may be substituted in place of high temperature release agents thereby avoiding the need for drying. Similarly, drying can also be eliminated by use of printed outer packaging jackets for the stuffed meat products in place of direct printed casings. Alternatively, the fibrous web may be imprinted prior to coating with viscose. Likewise, drying and the addition of glycerin can be eliminated in most instances because flat reelstock is more desirable than high density shirred tubular casings for most ready-to-stuff applications. However, when drying is not eliminated casings according to the present invention are remoisturized to the above stated levels.

The following specific examples demonstrate the products and methods of the present invention. However, it is to be understood that these examples are for illustrative purposes only and do not purport to be wholly definitive as to conditions and scope.

EXAMPLE I

A clear synthetic small diameter fibrous sausage casing is prepared by forming a long fiber hemp paper into a continuous tube which is passed through an annular die where a viscose dope consisting of cellulose xanthate dissolved in caustic soda is coated on both the inner and outer sidewalls saturating the web with a matrix. The saturated fibrous tube is then regenerated in an aqueous coagulating bath containing sulfuric acid, ammonium sulfate and sodium sulfate, and rinsed in a series of aqueous wash tanks to remove chemical impurities. Instead of plasticizing in glycerin or adding propylene glycol, the casing is immersed in an aqueous preservative bath saturated with 1500 ppm of propyl paraben. The bath temperatures is between 65° and 70° C. The residency time is two minutes. The casing is then reeled from the preservative bath, partially dried and analyzed. Propyl paraben content is determined by UV spectrophotometry by first extracting a sample with methanol and measuring absorbence at 295 nm after making the extract slightly basic. Moisture content is determined by toluene distillation by first refluxing the casing sample in toluene using a Dean-Stark Trap. The casing has a moisture content of 40 percent on an as is basis and about 525 ppm propyl paraben both on an as is basis.

Three 80 foot strands, prepared above, are inoculated with at least $5 \times 10^4$ spores of each of the following genera molds: Aspergillus, Penicillium, Cylindrocephalium, Fusidium, and Alternaria which were previously isolated from contaminated casings. A control casing is also prepared according to the above procedure except that it is not treated in the preservative bath containing the propyl paraben. The control is inoculated with spores from each of the same five molds. The humidified and inoculated strands, including the control, are placed in individual polyethylene bags and placed in a conditioning cabinet maintained at 85 percent relative humidity and a temperature of 30° C. The strands are maintained under these conditions for 40 consecutive days and then examined. The control strand which had not been treated in the preservative bath is observed to have heavy mold growth over the entire surface of the strand; whereas despite the heavy inoculation, one of the test stands showed no detectable mold growth and the remaining two test strands showed only very slight growth.

EXAMPLE II

Premoisturized, ready-to-stuff fibrous cellulosic sausage casing is prepared following the procedure of Example I except the preservative bath is prepared with 900 ppm propyl paraben containing 85 percent water and 15 percent propylene glycol as a cosolvent. The propyl paraben is first dissolved in the propylene glycol and then added to the water. The bath temperature is maintained at 60° C. All the propyl paraben remains in solution. The fibrous casing is immersed in the bath for two minutes and partially dried by conventional means to provide a casing with about 300 ppm propyl paraben on an as is basis, 5 percent propylene glycol by weight of liquid in the casing and a moisture content of about 50 percent on an as is basis. The casing is then shirred into individual strands of approximately 14 inches using conventional methods. In order to test the storagability of the strands three are inoculated with at least $5 \times 10^4$ spores/strand from the molds described in Example I and placed in individual polyethylene bags and stored according to the procedure of Example I. A control strand not treated in the preservative bath is also inoculated and tested. Two of the test strands have no observable mold growth. The third strand has only slight growth. The control casing shows appreciable contamination with visible mold.

Generally, fibrous casing under good practice handling conditions will have a spore contamination on the casing surface of less than one-half spore per square inch. Accordingly, the spore loading conditions of Examples I and II far exceed those encountered under typical packing house conditions.

EXAMPLE III

Large diameter gel type regenerated cellulose casing is prepared by the well known viscose process. Instead of plasticizing in an aqueous glycerin bath and drying the casing after being washed in a water bath, the casing is treated in a preservative bath at 60° C. for two minutes containing 900 ppm propyl paraben, 15 percent propylene glycol cosolvent and 85 percent water. The casing is analyzed and found to contain 219.5 percent water, 10.56 percent propylene glycol and 275 ppm propyl paraben all by dry weight. The premoisturized and preserved casing is wound on a reel and mounted on a Niedecker TCA Poly-Clip automatic stuffing machine. Bologna emulsion is stuffed in 500 feet of casing without casing breakage. The casing feeds smoothly through the shirring, stuffing and clipping cycles of the machine. Size control compares favorably with regular casing which is soaked in hot water prior to stuffing.

While the invention has been described in conjunction with specific examples thereof, this is illustrative only. Accordingly, many alternatives, modifications and variations will be apparent to persons skilled in the art in light of the foregoing description, and it is therefore intended to embrace all such alternatives, modifications and variations as to fall within the spirit and broad scope of the appended claims.

What is claimed is:

1. A method for making a ready-to-stuff premoisturized food casing which comprises the steps of providing a food casing and incorporating an effective amount of a high pH active antimycotic agent into said casing, said method including the step of incorporating sufficient moisture into the casing to form a premoisturized casing containing less than 15 percent polyol by weight of liquid in the casing.

2. The method of claim 1 wherein the finished casing contains less than 10 percent polyol by weight of liquid in the casing, and includes the step of packaging the casing.

3. The method of claim 1 wherein the antimycotic agent is an alkyl ester of p-hydroxybenzoic acid and the casing comprises from about 40 to about 240 weight percent water based on dry casing and from 100 to 1100 ppm of said ester.

4. The method of claim 3 wherein the casing comprises from about 55 to about 170 weight percent water based on dry casing and from about 200 to about 500 ppm of the p-hydroxybenzoic acid ester.

5. The method of claim 1 wherein the casing is a fibrous reinforced type casing.

6. The method of claim 1 wherein the casing is a non-fibrous reinforced casing.

7. The method of claim 3 including the step of first forming a preservative solution which comprises a saturated aqueous solution of the p-hydroxybenzoic acid ester.

8. The method of claim 7 including the step of heating the preservative solution to above ambient temperature conditions.

9. The method of claim 3 wherein the solution is an aqueous solution comprising from about 100 to about 1500 ppm of the p-hydroxybenzoic ester.

10. The method of claim 9 including the step of heating the solution to above ambient temperature conditions.

11. The method of claim 3 including the step of dissolving the p-hydroxybenzoic acid ester in a cosolvent and adding the resulting cosolvent solution to water to form an aqueous preservative solution.

12. The method of claim 11 wherein the cosolvent is an alcohol employed in an ester solubilizing amount.

13. The method of claim 12 wherein the alcoholic cosolvent is propylene glycol, ethanol or mixtures thereof.

14. The method of claim 12 wherein the cosolvent is propylene glycol.

15. The method of claim 14 wherein the p-hydroxybenzoic acid ester is a member selected from the group consisting of methyl, ethyl, propyl, butyl, and n-heptyl.

16. The method of claim 14 wherein the p-hydroxybenzoic acid ester is propyl p-hydroxybenzoate.

17. The method of claim 16 wherein the casing comprises from about 100 to about 500 ppm of the propyl p-hydroxybenzoate.

18. The method of claim 1 wherein the casing is substantially free of polyol.

19. A method for making ready-to-stuff premoisturized food casings having reduced drying requirements, which comprises the steps of providing a casing, and contacting the casing with a preservative solution comprising a $C_1$ to a $C_7$ alkyl ester of p-hydroxybenzoic acid in a sufficient amount to impart to said casing from about 100 to about 1100 ppm of the ester, said ester being dissolved in an aqueous solution containing from 0 to about 32 percent by weight of a cosolvent, said method including the step of incorporating sufficient moisture into the casing to form a premoisturized casing containing less than 15 percent polyol by weight of liquid in the casing, and packaging said casing.

20. The method of claim 19 wherein the casing is a fibrous reinforced type casing.

21. The method of claim 19 wherein the casing is a non-fibrous type casing.

22. The method of claim 20 wherein the water content of the casing is from about 55 to 170 percent by weight based on dry casing.

23. The method of claim 22 wherein the cosolvent is an alcohol and the p-hydroxybenzoic acid ester is present in the preservative solution in an amount sufficient to impart from about 200 to about 500 ppm to the casing, said cosolvent being present in solution in an amount from about 2 to about 25 percent by weight.

24. The method of claim 23 wherein the alcoholic cosolvent is propylene glycol, ethanol or mixtures thereof.

25. The method of claim 23 wherein the alcoholic cosolvent is propylene glycol.

26. The method of claim 24 wherein the ester is propyl p-hydroxybenzoate.

27. The method of claim 19 wherein the casing is substantially free of polyol.

28. A method for making a ready-to-stuff premoisturized food casing which comprises the steps of:
(a) forming a film forming polymer into a length of tubular casing;
(b) regenerating the tubular casing in a coagulating bath;
(c) washing and plasticizing the casing with water;
(d) contacting the moistened casing with an antimycotic agent according to the method of claim 1 wherein said antimycotic agent is substantially free of acid groups and is applied in the form of a solution to provide a casing containing less than 15 percent polyol by weight of liquid in the casing, said solution including 0 to about 32 percent by weight of an alcoholic cosolvent; and
(e) packaging the casings.

29. The method of claim 28 wherein the antimycotic agent is an alkyl ester of p-hydroxybenzoic acid, the film forming polymer is cellulose and the water content of the casing is from about 40 to about 240 percent by weight based on dry casing.

30. The method of claim 29 including the step of reducing the water content by drying.

31. The method of claim 30 wherein the preserved casing has a moisture content of between about 55 and about 170 weight percent based on dry cellulose.

32. The method of claim 29 wherein the casing is substantially free of glycerin and propylene glycol.

33. The method of claim 30 wherein the moisture content of the casing is at a level as to permit shirring of said casing.

34. The method of claim 30 wherein the alkyl ester of p-hydroxybenzoic acid is methyl, ethyl, propyl, butyl or n-heptyl and the alcoholic cosolvent is selected from the group consisting of propylene glycol, ethanol and mixtures thereof.

35. The method of claim 34 wherein the preservative solution imparts to the casing from about 50 to about 500 ppm of propyl p-hydroxybenzoate.

* * * * *